(12) United States Patent
Kathe et al.

(10) Patent No.: US 8,663,450 B1
(45) Date of Patent: Mar. 4, 2014

(54) GUIDE BORE ELECTRICAL MACHINING METHODS

(75) Inventors: Eric Kathe, Ballston Lake, NY (US); Joseph Carter, Ballston Spa, NY (US)

(73) Assignee: The United States of America as Represented by the Secretary of the Army, Washington, DC (US)

(*) Notice: Subject to any disclaimer, the term of this patent is extended or adjusted under 35 U.S.C. 154(b) by 567 days.

(21) Appl. No.: 12/949,910

(22) Filed: Nov. 19, 2010

(51) Int. Cl.
 *B23H 9/14* (2006.01)
(52) U.S. Cl.
 USPC .................. 205/686; 204/224 M
(58) Field of Classification Search
 USPC .................. 204/224 M; 205/686
 See application file for complete search history.

(56) References Cited

U.S. PATENT DOCUMENTS

| | | | |
|---|---|---|---|
| 3,590,204 A | | 6/1971 | O'Connor |
| 5,306,401 A * | | 4/1994 | Fierkens et al. ............. 415/232 |
| 5,837,921 A | | 11/1998 | Rinaldi et al. |
| 6,454,930 B1 * | | 9/2002 | Derighetti .................... 205/645 |
| 7,032,584 B2 | | 4/2006 | Tidman et al. |
| 7,462,273 B2 * | | 12/2008 | Mielke ......................... 205/651 |
| 7,867,374 B2 * | | 1/2011 | Zdeblick et al. ............. 205/649 |
| 2003/0006137 A1 * | | 1/2003 | Wei et al. ..................... 204/280 |
| 2008/0230379 A1 * | | 9/2008 | Lee et al. ................. 204/290.01 |

OTHER PUBLICATIONS

G. Bellows and J. Kohls, "Drilling without Drills" Special Report 743, American Machinist, Mar. 1982.
Coteată et al, "Electrochemical discharge machining of small diameter holes," Engineering International Journal of Material Forming, vol. 1, Supp. 1, pp. 1327-1330, 2008.
Pandey et al., "Effect of Electrode Rotation on the Accuracy of Hole Reproduction in Electrochemical Drilling," Precision Engineering, vol. 6, No. 1, pp. 17-23, Jan. 1984.

* cited by examiner

*Primary Examiner* — Nicholas A Smith

(57) ABSTRACT

A method of electrically machining a hole in a conductive work piece may include providing a tool having a conductive tool head in close proximity to the conductive work piece. A voltage may be applied across the tool head and the work piece to create an electric field in the hole at the tool head. The electric field may be asymmetric with respect to the centerline of the hole. The orientation of the hole may be altered by removing material from the work piece using the asymmetric electric field.

5 Claims, 13 Drawing Sheets

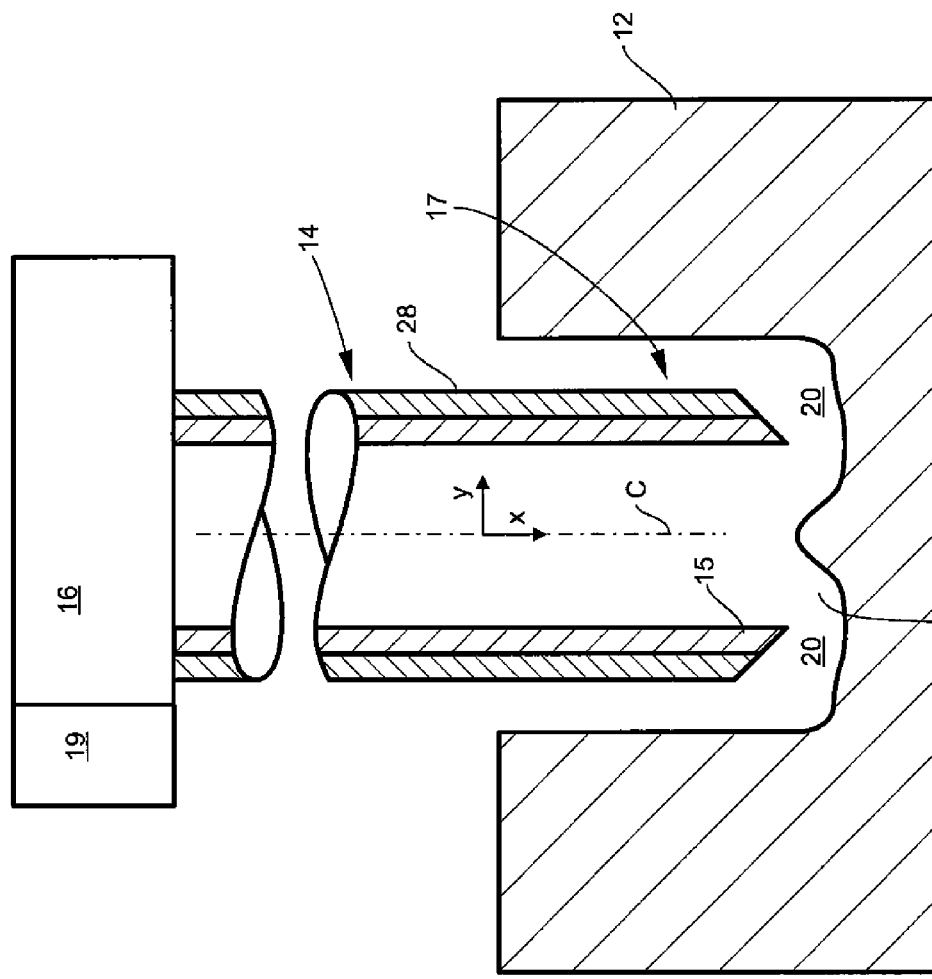
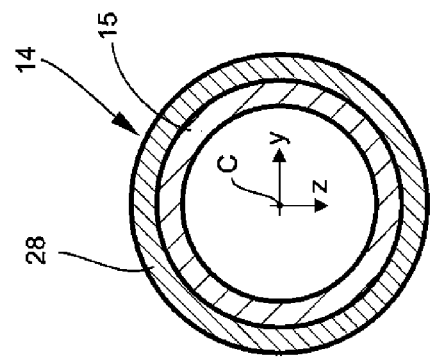
Fig. 3A
Fig. 3B

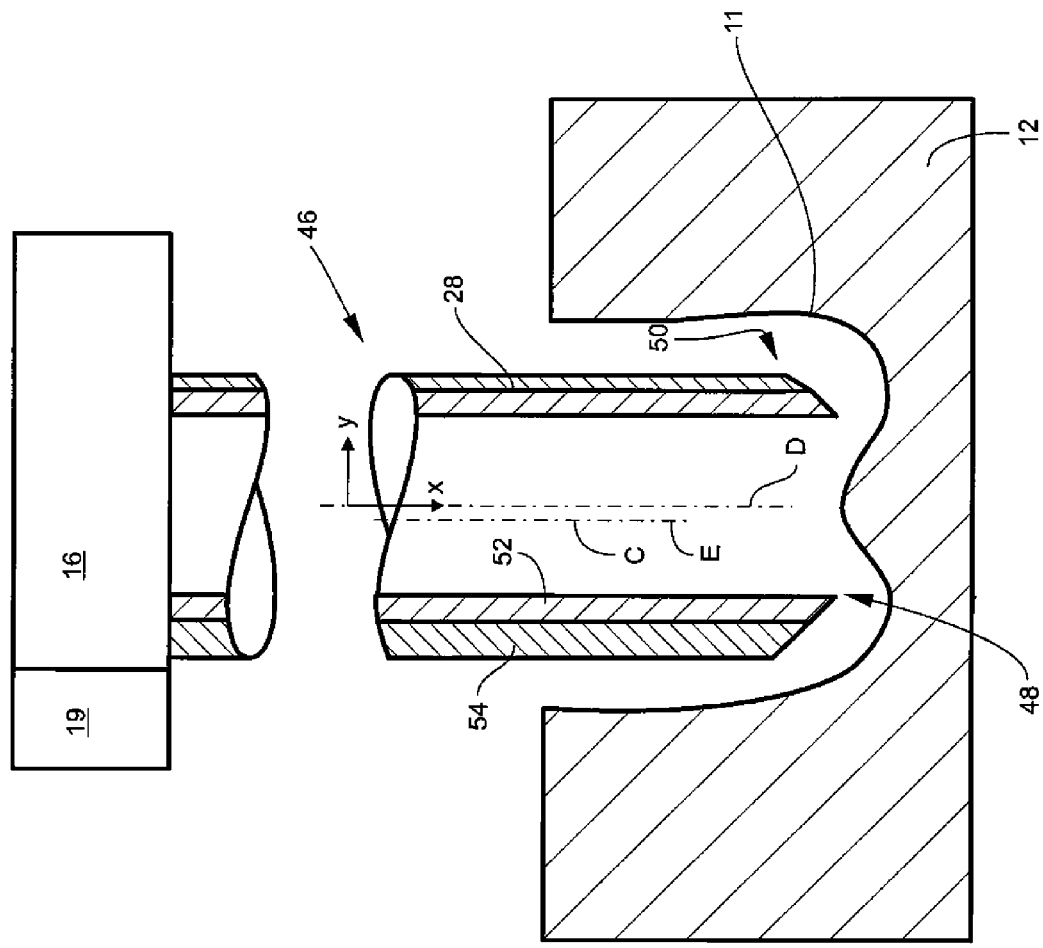
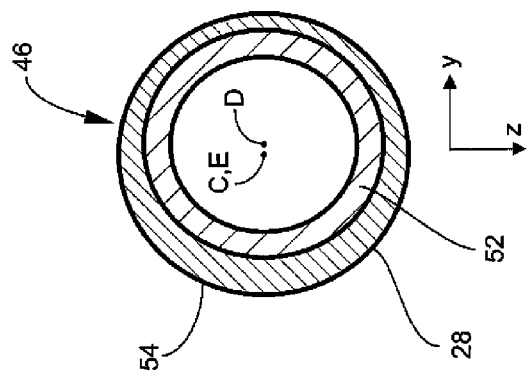
Fig. 4A
Fig. 4B

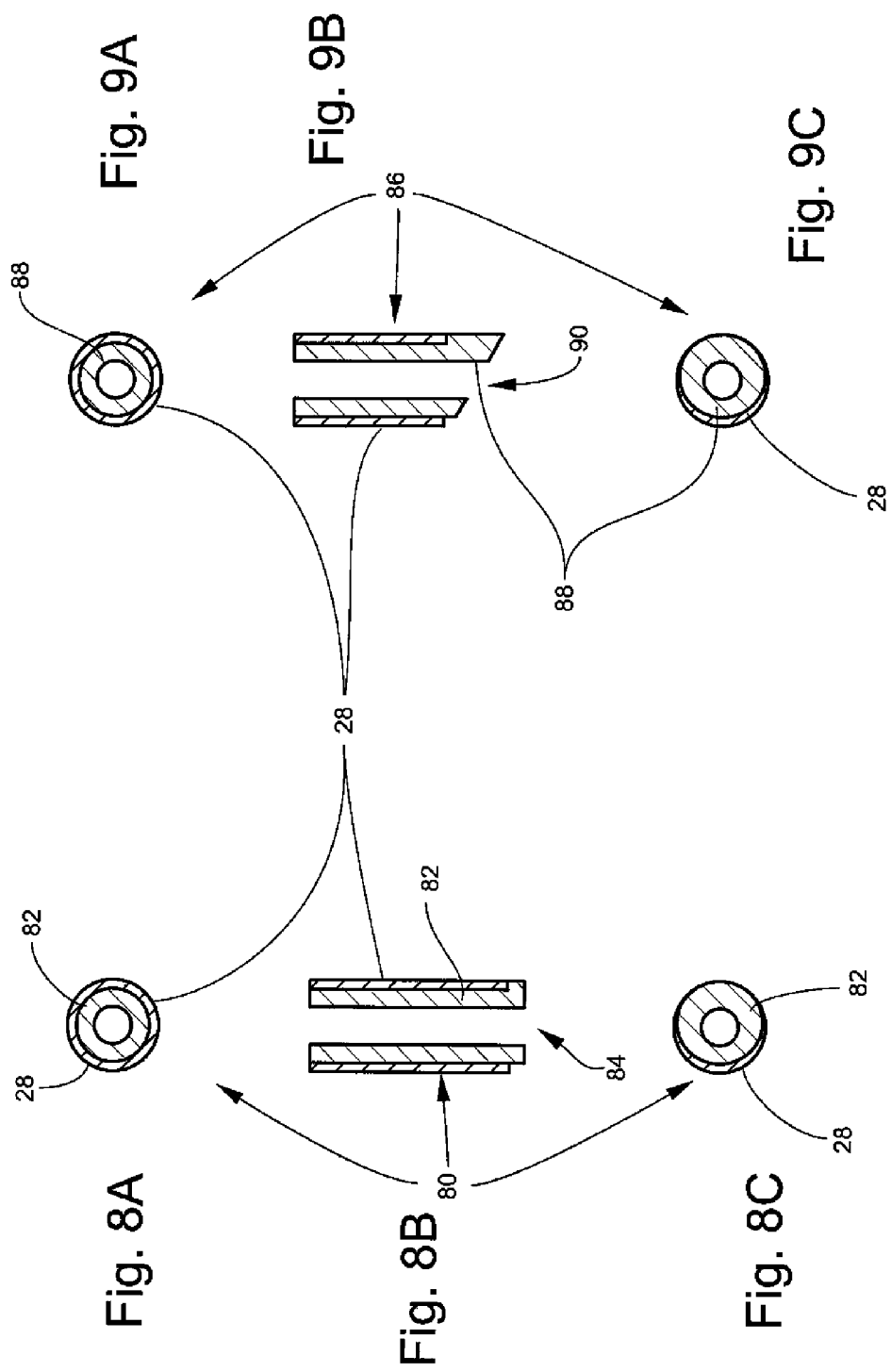

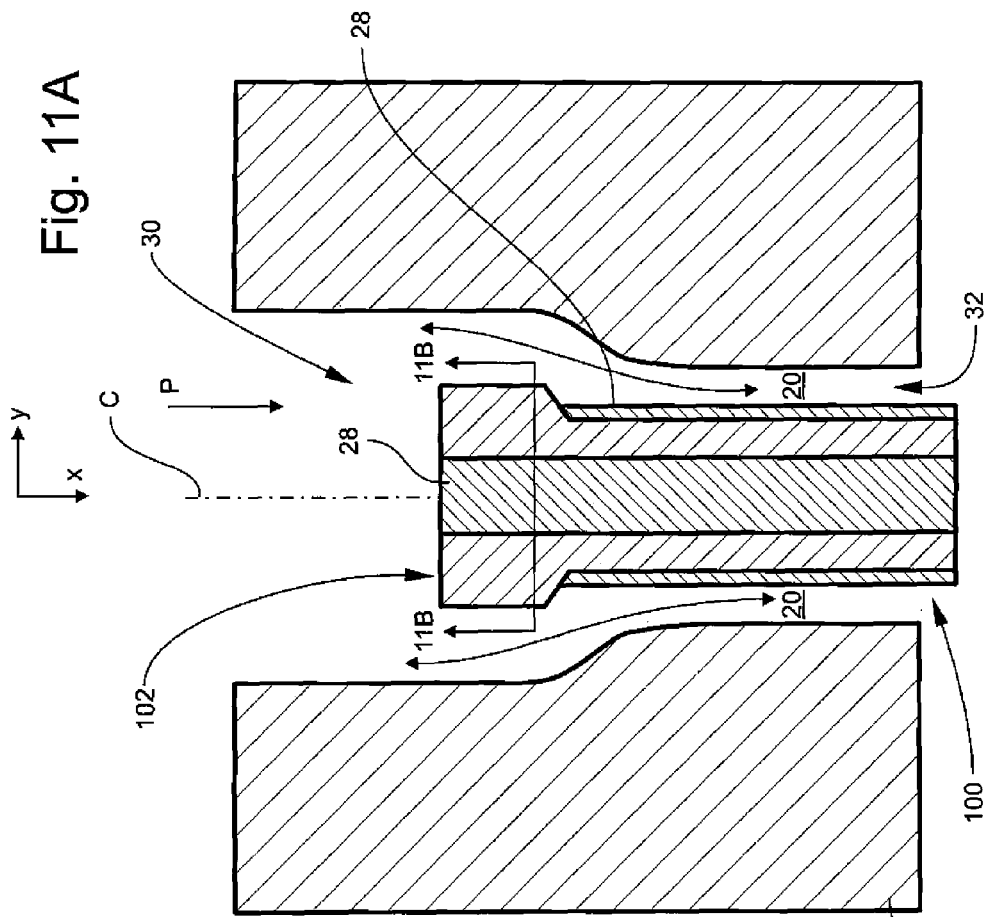
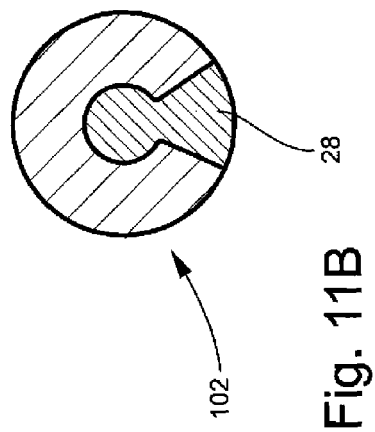

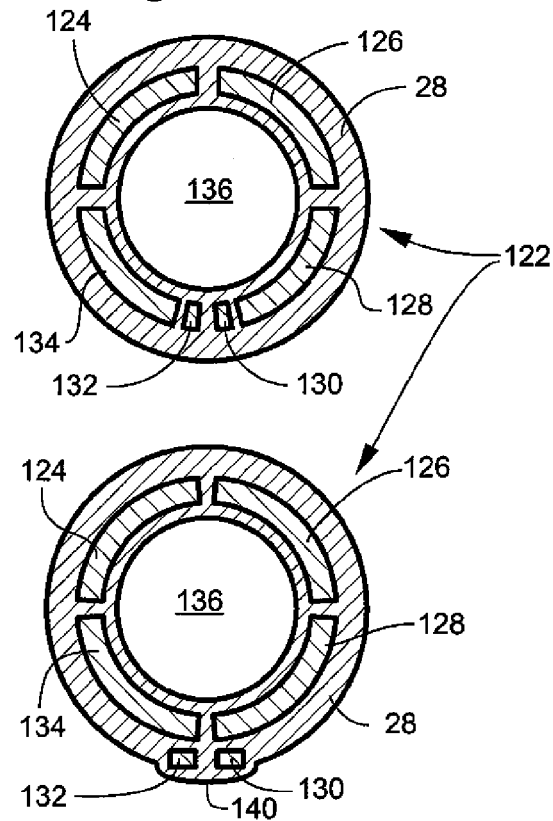
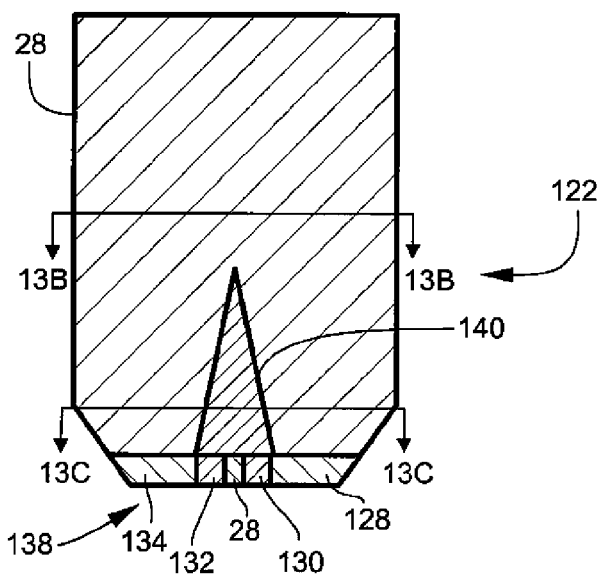

GUIDE BORE ELECTRICAL MACHINING METHODS

STATEMENT OF GOVERNMENT INTEREST

The inventions described herein may be manufactured, used and licensed by or for the U.S. Government for U.S. Government purposes.

BACKGROUND OF THE INVENTION

The invention relates in general to machining and in particular to the electrical machining or drilling of holes.

Rotating cutting drills may be used to drill blind holes or to enlarge existing holes. The aspect ratio of a hole is the ratio of the length or depth of the hole to the diameter of the hole. As the aspect ratio of a hole becomes large, removal of chips (machined off of the work piece) may become a principal concern.

One method to improve precision on rotating drills may be to focus upon achieving a stiff cutting tool, or employing mechanical guides within the hole to maintain precision. A second approach may be to incorporate an active guide within the work piece. The active guide may further complicate chip removal and may be challenging to employ for very small diameter holes.

Energy beam machining methods may include laser-beam machining and electron-beam machining. These methods may be used to drill a line of sight hole. These methods are generally limited to shallow holes due in part to debris interfering with the line of sight path as the work piece material is removed by the energy beam.

Certain applications may present challenges for known drilling methods. For example, using known methods, it may not be viable to drill a 12 mm diameter hole that is 6 meters deep, with a blind hole aspect ratio of 500. Holes of this type may be used, for example, as cooling channels in railguns. Because of the difficulty in drilling such holes, railgun designs may use welded or mechanically bound rails to allow cooling channels to be machined prior to joining the parts (K. Jamison et al., "Thermal Loading and Heat Removal from a Sequentially Fired Railgun, IEEE Transactions on Magnetics, vol. 31, no. 1, pp. 314-319, January 1995). High aspect ratio holes may also be used to route power, sensor, data, or telecommunication transmission lines through structural elements.

Challenges for known drilling methods may include: 1) the transmission of rotating mechanical cutting power through a long slender shaft; 2) the loss of cutting tool directional control through a long slender shaft; 3) work piece material removal through a long slender hole; and 4) the interaction of mechanical cutting loads and related disturbances upon the application of control forces.

Various electrical machining methods are known. Electrical machining methods may include electrochemical machining (ECM), shaped-tube electrolytic machining (STEM), electro-stream (ES), electrical discharge machining (EDM), and electrical discharge wire cutting (EDWC). G. Bellows and J. Kohls ("Drilling without Drills" Special Report 743, *American Machinist*, March 1982) review some of the known electrical machining processes. Bellows and Kohls' Special Report 743 is expressly incorporated by reference herein.

FIG. 1 is a schematic diagram of an example of a known electrical machining process. A hole 10, for example, may be electrically machined in a work piece 12. An electrical machining tool 14 may be supported and controlled by a tool holder 16. A controller 19 may be included as part of tool holder 16, or may be a separate component. Tool 14 may have an electrically conductive, tubular portion 15 with a hollow interior 24. A power supply 18 may be connected between tool holder 16 and work piece 12. Tool 14 may function as an electrode, such as a cathode, and work piece 12 may function as an electrode, such as an anode.

Hole 10 generally includes an overcut. The overcut results in hole 10 having a cross-section that is larger than the cross-section of tubular portion 15. Thus, entire tool 14 may be inserted in hole 10 with sufficient annular clearance between tool 14 and hole 10. An electrical machining fluid (EMF) 20 may circulate from tank 22 through an EMF processor 26 to tool holder 16, through hollow interior 24 of tool 14 into hole 10 in work piece 12, and then back into tank 22, as shown by the arrows in FIG. 1. Processor 26 may process EMF 20 by, for example, filtering, removing sludge, temperature conditioning, etc.

In the case of ECM, EMF 20 may be an electrolytic fluid and hole 10 in work piece 12 may be created by anodic dissolution. In the case of EDM, EMF 20 may be a dielectric fluid and hole 10 in work piece 12 may be created by erosive dissolution caused by spark discharges. In the case of electrochemical discharge machining (ECDM), EMF 20 may be a semidielectric fluid and hole 10 in work piece 12 may be created by a combination of anodic and erosive dissolution. A discussion of ECDM appears in Coteată et al, "Electrochemical discharge machining of small diameter holes," *Engineering International Journal of Material Forming*, Volume 1, Supplement 1, pp. 1327-1330, 2008, which is expressly incorporated by reference herein.

For use in ECM, tool 14 may be manufactured with a layer of electrically insulating material 28 around conductive tube 15. Of course, at the head 17 of tool 14 at least a portion of tube 15 must not be covered with insulating material 28 so that an electric circuit may be established between tube 15 and work piece 10. Insulating material 28 may prevent unwanted anodic dissolution of sides of hole 10. In EDM or ECDM, insulating material 28 may not be required around tube 15.

In electrical machining processes, tool holder 16 may provide one of more of the following functions: 1) axial translation (feed) of tool 14; 2) rotation of tool 14 about its longitudinal axis; 3) distribution of electrical current to tool 14 for anodic and/or erosive dissolution of work piece 10; and 4) channeling of EMF 20 to tool 14. See, for example, U.S. Pat. No. 3,590,204 issued to O'Connor on Jun. 29, 1971.

As hole 10 machined in work piece 12 increases in depth, the side walls of hole 10 may guide tool 14 on its intended path through work piece 12. Accurately drilled holes may be limited in their depth by the compliance and straightness of tool 14. As the aspect ratio of hole 10 becomes large, the propensity of tool 14 to bend may increase, thereby causing a loss of precision in drilling.

For example, if a simple round tool of a given diameter is considered a cantilevered beam, the tip deflection of the tool for a given lateral disturbance may increase as the third power of the tool length (F. Beer and E. R. Johnston, Jr., "Mechanics of Materials," McGraw-Hill 1981). Similarly, torsional stiffness of a simple cantilevered tool is inversely proportional to length. Rotational deflection at the cantilever tip, for a given torsional disturbance, may increase in proportion to the tool length (Beer and Johnston, supra).

A known ECM process (FIG. 2) may be used to machine a hole 30 in a work piece 34 having a pilot hole 32. An ECM tool 36 may include a solid conductive cylinder 38 covered with an insulating layer 40. As noted before, at the head 42 of tool 36 at least a portion of cylinder 38 must not be covered with insulating material 40 so that an electric circuit may be established between cylinder 38 and work piece 34. Pilot hole 32 and the annular area 44 between tool 36 and work piece 34 may provide a flow path for EMF 20. The direction of flow may be either into or out of pilot hole 32.

A process akin to that of FIG. 2 was used to enlarge a pilot bore and create a naval cannon with a five inch caliber (inner diameter) and a length of 270 inches. In that case, the straightness of the pilot bore was relied upon to achieve the desired final gun bore centerline (Wessel, "Electrochemical Machining of Gun Barrel Bores and Rifling," Naval Ordnance Station, Report No. MT-050, Louisville, Ky., September 1978).

A need exists for a more accurate method of electrically machining large aspect ratio holes.

SUMMARY OF THE INVENTION

It is an object of the invention to provide methods for electrically machining large aspect ratio holes.

One aspect of the invention is a method of electrically machining a hole in a conductive work piece. The method may include providing a tool having a conductive tool head. The tool head may be in close proximity to the conductive work piece. Voltage may be applied across the tool head and the work piece to create an electric field in the hole at the tool head. The electric field may be asymmetric with respect to a centerline of the hole. The orientation of the hole may be changed by removing material from the work piece using the asymmetric electric field.

The method may include providing an electrical machining fluid in contact with the tool head and the work piece.

Changing the orientation of the hole may include rolling the tool head. Changing the orientation of the hole may include changing a direction of the centerline of the hole. Changing the direction of the centerline of the hole may include pitching and/or yawing the centerline of the hole.

The method may include determining a difference between an orientation of the hole and a desired hole orientation. Determining the difference in orientations may include determining the difference between a position of the hole centerline and a position of a desired hole centerline. The determined difference in orientations may be used to control the asymmetric electric field.

The tool head may include a centerline. Removing material from the work piece may include rotating the tool head around its centerline. Rotating the tool head may include modulating a frequency of rotation of the tool head. Rotating the tool head may include modulating the voltage across the tool head and the work piece.

The conductive tool head may have an asymmetric geometry. In one embodiment, the tool head may be generally circular in section. Some embodiments of the tool head may include an external insulating layer over conductive material. Some tool heads may include a plurality of cathodes. The method may include applying a plurality of voltages across the plurality of electrodes and the work piece.

The method may include fixing the tool to a tool holder and inserting the tool holder into the hole. The tool and the tool holder may simultaneously descend into the hole as the hole is electrically machined by the tool. Hydraulic force may be applied to the tool holder to descend the tool holder into the hole.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

FIG. 3A is a schematic drawing of a symmetric example of electrical machining.

FIG. 3B is an end view of the tool head of FIG. 3A.

FIG. 4A is a schematic drawing of an asymmetric example of electrochemical machining.

FIG. 4B is an end view of the tool head of FIG. 4A.

FIGS. 8A-C are top, side, and bottom views, respectively of a geometrically asymmetric tool head.

FIGS. 9A-C are top, side, and bottom views, respectively of another geometrically asymmetric tool head.

FIG. 11A is a schematic view of a tool being pulled through a work piece.

FIG. 11B is a sectional view taken along the line 11B-11B of FIG. 11A.

FIG. 13A is a side view of a tool head for machining a circular hole with a keyway or slot feature.

FIG. 13B is a sectional view along the line 13B-13B of FIG. 13A.

FIG. 13C is a sectional view along the line 13C-13C of FIG. 13A.

DETAILED DESCRIPTION OF THE PREFERRED EMBODIMENTS

Figure 1:
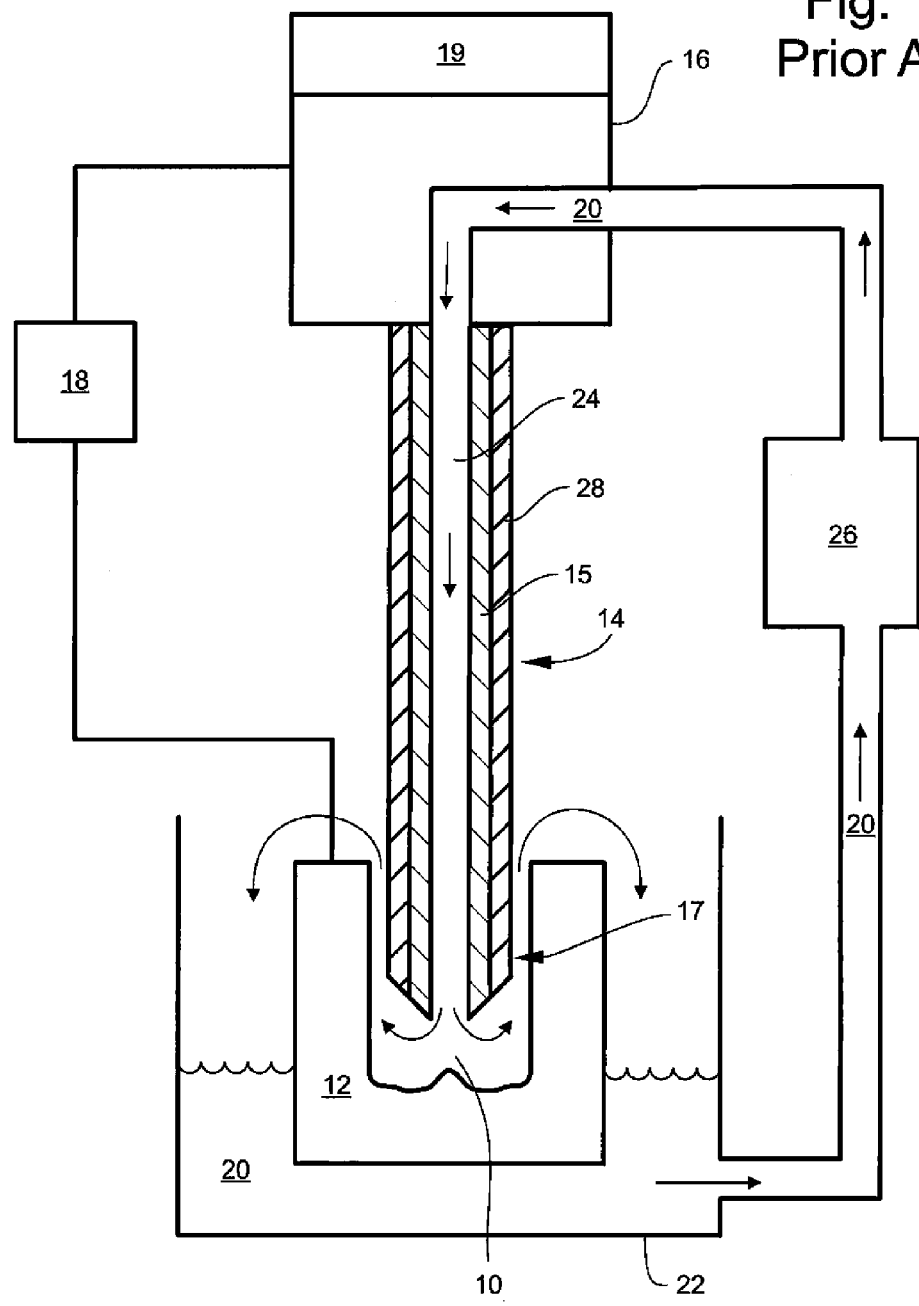
FIG. 1 is a schematic diagram of an example of a known electrical machining process.

A novel electrical machining process may enable the precision drilling of very high aspect ratio holes in work pieces made of conductive materials. The electrical machining process may also produce superior surface finishes and thereby enhance fatigue life. The electrical machining process may use a feedback control method to control the position of the longitudinal axis or longitudinal centerline of a hole as the hole is electrically drilled. In addition to drilling straight holes, the method may be used to engineer deviations from a straight centerline. The method may also be used for small holes with maximum cross-sectional chords that are a small fraction of a centimeter.

The method may be used, for example, to drill gun bores in cannons and to drill cooling and flow channels in cannons. For example, the integral mid-wall cooling channels of the gun tube disclosed in U.S. Pat. No. 5,837,921 issued to Rinaldi et al. may be achieved by drilling. Blind holes may be drilled accurately into the gun tube. The blind holes may, for example, change their radial distance from the gun bore center line with axial position. Elliptical or kidney shaped holes may provide decreased stress concentrations in the load axis of interest to maximize fatigue life. Electrical machining may also provide a method for drilling integral cooling channels within the rails of a railgun.

Advantages of the novel electrical machining method may include: 1) the accurate placement of cooling channels in optimal locations; 2) the drilling of cooling channels that deviate from a straight line (for example, to follow the contour of the cannon or enable external cooling at a location, such as the origin of rifling, relative to other locations); 3) the drilling of flow passages for applications such as bore evacuator holes (commonly subject to erosion and fatigue) and spindles; and 4) drilling gun bores with improved concentricity.

The electrical machining process may achieve accuracy through feedback control. Conceptually, the dynamic system of the work piece and the drilling apparatus may be considered to exist in various quantitative states during drilling. The size of the actual hole as it is drilled (e.g., depth and diameter), the position of the hole (e.g., the centerline position, axial position, and direction at the blind end), the position and feed rate of the tool within the hole, the current density distribution at the cutting end of the tool, the temperatures of various components, and the chemical composition of the electrolyte (in the case of electrochemical machining (ECM)) may all be examples of states of the dynamic system. Inputs that may be used to control the dynamic system may include the flow rate, direction, and temperature of the electrolyte (for ECM), the voltage of the power supply, and the tool feed rate.

Outputs of the dynamic system may be measurable variables related to performance of the dynamic system. For example, in ECM, the state of the chemistry of the electrolyte as it radially traverses the face of the hole may be of interest, but the state of the chemistry of the electrolyte may not lend itself to measurement. Often, states that may not be easily measured may be inferred from outputs or variables that may be more easily measured.

Feedback control of a dynamic system may be achieved with three elements. One element may be controllability (C. T. Chen, *Linear System Theory and Design*, Harcourt Brace College Publishers, 1984). A system may be controllable if, for any given state of the system at one point in time, it would be possible to achieve a desired state at a finite future time, using possible control inputs. Control inputs may provide control to steer the future state of the system in the desired direction. In the case of drilling a hole, the trajectory of the centerline of the hole as it is drilled may be steered.

A second element of feedback control of a dynamic system may be observability (C. T. Chen, supra). A system may be observable if the state of a system may be inferred by monitoring the output of the system. Measurements may provide information to estimate the present state of the system.

A third element of feedback control of a dynamic system may be a control law (W. L. Brogan, *Modern Control Theory*, $2^{nd}$ ed., Prentice Hall, 1985). A control law may be a method to determine how inputs should be applied to the system, based upon measured outputs, to meet a desired objective.

The electrical machining process may measure the progress of holes as they are drilled (observability) and establish a means to achieve controllability of a guide bore system. Methods for monitoring the drilling of a hole within a work piece are known. X-ray imaging, for example, may be used to monitor the geometry of a hole as it is drilled within a work piece (See, for example, Cutler and Pendleton, "Real-Time Field Radiography of an Operating Jet Engine Using a Portable Linear Accelerator," High Energy Services Corp. (HESCO), Redwood City, Calif., http://www.hescoxray.com/white/docs/jet.pdf). Ultrasonics may have the ability to monitor electrodeposition (an inverse process to ECM) with a reported accuracy within 8 μm (J. Frankel, M. Doxbeck, and A. Abbate, "Computerized Ultrasonic System For On-Line Determination Of Chromium Thickness During Plating Of Tubes," Benet Technical Report ARCCB-TR-93001, January 1993).

The electrical machining process may use a novel means to apply control inputs to the dynamic system of the work piece and the drilling apparatus. Mechanical drilling may require the application of control forces to cutting tools. Electrical machining may control the progression of the centerline of the hole by the application of controlled changes to the electric field between the tool and the work piece. Controlled changes to the electric field may be used to control the direction of drilling, thereby decreasing or eliminating reliance upon the tool bending stiffness to achieve precision drilling. In ECM, the electric field may affect the current density that conveys electric charge to the work piece through the electrolyte, to thereby dissolve work piece material. In electrical discharge machining (EDM), the electric field may affect the electrical discharges that erode the work piece material.

The centerline of a hole may be progressively drilled out by the head of the tool. The position of the tool head, as it dissolves (or erodes) and removes work piece material, may closely follow the centerline of the hole. Therefore, real-time measurement of the hole size and location may reveal the position of the front face of the tool head in space. Trajectory terminology, such as roll, pitch, and yaw, may be used to describe the direction of the progressing tool head as it is drilling through the work piece (see, for example, H. Baruh, *Analytical Dynamics*, McGraw-Hill, 1999).

A symmetric paradigm for electrical machining is schematically shown in FIGS. 3A and 3B, along with an Cartesian coordinate system having x, y, and z axes. Using right hand Cartesian coordinates, for example, the positive x-axis may be forward into hole 10 and may represent the centerline C of hole 10. The positive y-axis may be to the right as shown in FIGS. 3A and 3B, and the positive z-axis may be up (orthogonal to the view of FIG. 3A).

Tool 14 may include tool head 17 disposed in hole 10 in work piece 12. Tool head 17 may include conductive tube 15 covered with insulation 28. Conductive tube 15 may include hollow interior 24 as a conduit for EMF 20. Tool 14 may be supported by tool holder 16. Roll, $\omega_x$, may be rotation of tool head 17 about the x-axis. Pitch, $\omega_y$, may be rotation of tool head 17 about the y-axis. Yaw, $\omega_z$, may be rotation of tool head 17 about the z-axis. Roll, pitch, and yaw of tool head 17 may be controlled states. The feed rate of tool head 17, dx/dt, may be the time rate of change of the forward position of tool head 17 and may be a controlled state.

Pitch and yaw of tool head 17 may be achieved by conforming tool head 17 to the side walls of hole 10 as hole 10 is electrically drilled. Roll of tool head 17 may be controlled by tool holder 16. Existing tool design methods may be employed to ensure an adequate egress route for flow of EMF 20 as tool head 17 conforms to the side walls of hole 10. Helical flutes may be incorporated into insulator 28 (see, for example U.S. Pat. No. 3,880,745). Controllability of the location or orientation of hole 10 as it is machined may be achieved by deviating centerline C of hole 10 as tool head 17 is fed into work piece 12 at a feed rate. For holes that are not round, control of roll may allow the hole cross-section to rotate or twist as tool head 17 is fed into work piece 12 (or may allow tool head 17 to be intentionally held straight).

The electrical machining process may achieve controllability by identifying control inputs that may be applied to favorably distort the electric field at tool head 17. In ECM, distortion of the electric field at tool head 17 may cause a distortion of the electric current flow through the electrolyte, and, thus, a distortion of the dissolution rate of work piece 12. In EDM, distortion of the electric field at tool head 17 may cause a distortion of the electrical discharges from tool head 17 to work piece 12, and, thus, a distortion of the erosion rate of work piece 12. Eroding work piece 12 with EDM effectively dissolves work piece 12. In general, the rate of erosion or dissolution in work piece 12 may increase in areas of increased electric field strength. Other influences on the dissolution rate, such as EMF flow rate, temperature, and conductivity, may be ascertained by those skilled in the art of cathode tool design (Rajurkar et al., "New Developments in Electrochemical Machining," Keynote Paper, Annals of the CIRP, vol. 48, no. 2, pp. 569-579, 1999).

Distortion of the electric field at tool head 17 may cause desired changes in pitch and yaw of centerline C of hole 10, and in some cases, may cause desired changes in roll of the hole cross-section. The controllability of tool head 17 may also be affected by the stiffness of tool 14. In general, if tool 14 has a higher bending stiffness, it may be more likely to bind up, or be unable to conform to, a hole with a curved centerline. If tool 14 is relatively straight and stiff; it may require only small feedback control corrections to maintain an intended straight path. If tool 14 is less stiff, it may be more appropriate for holes with other than straight centerlines. One exception to this general principle is a uniformly curved hole, which may be machined with a stiff tool having the same uniform curvature as the hole, for example.

A control law may infer the rotational state of tool head 17 from observed measurements. Inferring the rotational state may become challenging due to increased mechanical compliance of tool 14 as the aspect ratio of the hole becomes large. Fortunately, in contrast to mechanical drilling, cutting torques may not accompany electrical machining methods. When electrically boring a high aspect ratio hole, the rotational flexure of a long tool may be well behaved. Thus, the rotational state of the tool head may be inferred even if a torsional bending mode of a long tool creates a discrepancy between the actual rotation at the tool head and the rotation measured at the tool holder. Output sensors and control logic may be used to infer such a state.

Secondly, asymmetry in the electric field at the tool head, and, therefore, asymmetry in the current density at the tool head, may produce a roll-dependent magnetic field in the work piece. This may be particularly useful for long narrow work pieces. For example, in a railgun rail, a cannon tube, or a structural steel beam, magnetic field sensors may be placed along the work piece near the axial location of the blind hole face. Observability may not require continuous measurement of rotational position. Discontinuous identification of position (analogous to an automotive timing light used to infer engine flywheel position relative to spark timing) may suffice.

Thirdly, as mentioned previously, methods for monitoring the drilling of a hole within a work piece are known. X-ray imaging and ultrasonics may be two such methods.

Given a measured position or orientation of the hole face and a desired centerline trajectory, it may be possible to determine the desired correction for both pitch and yaw for the particular axial location (along the x-axis) where the hole face is being dissolved. The desired corrections for pitch and yaw may be related to the measurement of the error in units of length, e.g., µm. A control law may be formulated to feedback the error measurement to the electrochemical machining system. The control law may be used to control the asymmetric electric field at the tool head.

An asymmetric field at the tool head may be created in different ways. One way to create an asymmetric electric field at the tool head is to use a tool head having an asymmetric geometry. FIGS. 4A and 4B show a tool 46 having a tool head 50 with a generally circular cross-section. Tool head 50 may include a conductive tube (cathode) 52 of uniform thickness. Tube 52 may be covered with an insulation layer 28. The thickness of insulation layer 28 may vary circumferentially, for example, as shown in FIGS. 4A and 4B. Hole 48 in work piece 12 may have a centerline C. Tube 52 may have a centerline D. Tool head 50 may have a centerline E coincident with centerline C of hole 48. Centerline E of tool head 50 may be the centerline of a cylinder defined by the outer circumference 54 of insulation layer 28. Centerline D of tube 52 may be offset from centerline E of tool head 50 and centerline C of hole 48, as shown.

A controlled yaw (deflection of the centerline C of hole 48 in the y direction) may be applied to hole 48 using tool head 50 having variable thickness insulation layer 28. The controlled yaw may result in a change in direction of centerline C of hole 48. The geometric asymmetry of tool head 50 may increase the electric field (volts per meter) where conductive tube 52 (cathode) is closer to the wall 11 of work piece 12. Increasing the electric field may increase the current density and dissolution rate of work piece 12 where tube 52 is closer to wall 11. The asymmetric electric field produced by tool head 50 is asymmetric with respect to centerline C of hole 48.

Figure 4C:
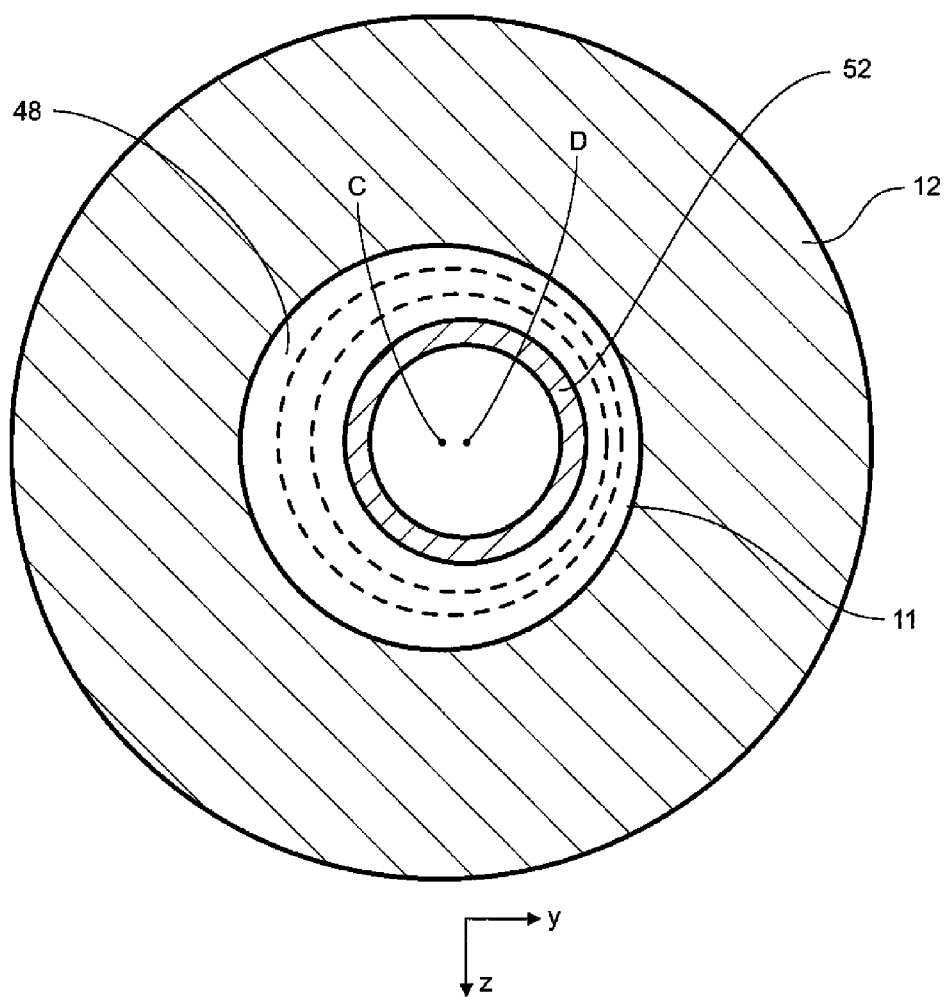
FIG. 4C is a simplified diagram of equipotential lines of an asymmetric electric field.

FIG. 4C is a simplified representation of a radially asymmetric electric field analogous to the asymmetric field that may be produced by tool head 50. For simplicity, the field resulting from conductive tube 52 is shown within a grounded conductive work piece 12 at an elevated voltage with no insulating layer 28 or EMF 20 present. The dashed lines are lines of equipotential. Centerline D of conductive tube 52 is offset from centerline C of hole 48. Where the lines of equipotential are closer, the electric field is increased.

The asymmetric electric field created by tool head 50 of FIGS. 4A and 4B may be used to control the direction of centerline C of hole 48. Control methods may include rotation of tool head 50 about the x-axis (centerline C of hole 48). Rotation of tool head 50 may produce a time-averaged symmetry in the machining operation (See, for example, Pandey et al., "Effect of Electrode Rotation on the Accuracy of Hole Reproduction in Electrochemical Drilling," Precision Engineering, vol. 6, no. 1, pp. 17-23, January 1984 and Coteată et al., supra).

One method to control yaw and pitch of centerline C is to modulate the frequency of rotation of tool head 50. If the position sensors of hole 50 indicate that an increase in yaw is required (i.e., move centerline C in the positive y-axis direction), then the roll (angular velocity about the x-axis) of tool head 50 may be decreased when the portion of tool head 50 with the thinner layer of insulation 28 is near the side of work piece 12 that requires greater material removal. Taken to its logical extreme, rotation or roll may be ceased to maximize increase of yaw.

Another method to control yaw and pitch of centerline C is to maintain constant roll (constant angular velocity about the x-axis), while modulating the voltage across tool head 50 and work piece 12. The voltage may be increased when the thin insulator side of tool head 50 is near the side of work piece 12 that requires greater material removal. This voltage increase may preferentially increase the rate of material removal and achieve a greater level of material removal with each rotation of tool head 50 about the x-axis.

A small gain (positive or negative) may be applied to the measured error in the centerline C ($e_y$ and $e_z$ in the y-axis and z-axis directions, respectively). For the constant roll method, the voltage to tool head 50 may include a constant voltage and a pair of sine wave voltages. The sine wave voltages may both have the same frequency as the roll of tool head 50. One sine wave voltage, $sin_y$, may be phase-aligned with the y-axis. That is, $sin_y$ may have its peak value when tube 52 of tool head 50 is closest to wall 11 in the y-axis direction. Similarly, $sin_z$ may be phase-aligned with the z-axis direction. A proportional gain may be multiplied (e.g., mV/μm of error) in each axis and summed with the constant voltage. The determination of the gain may be case dependent and may be solved by those skilled in the art. Net voltage reversal of the tool should be avoided to prevent tool wear. More advanced control laws may also be applied.

The guide bore control laws may be applied in concert with feedback control laws that may govern the feed rate and axial progression of tool head 50 through work piece 12. For example, a direct current voltage bias may be applied to increase or decrease the rate of dissolution of the material of work piece 12, for a given axial feed rate of tool head 50. The force applied to feed tool head 50 into hole 48 may also be controlled. Such control methods for axial feed rate are known in the art. In general, reduction in axial feed rate may allow greater controllability of hole trajectory by increasing the duration of exposure to controlled electric field distortions. This may allow more modest electric field distortions and may avoid exceeding electric field limitations. For example, in ECM, a voltage that is too great may arc through the electrolyte.

Figure 5A:
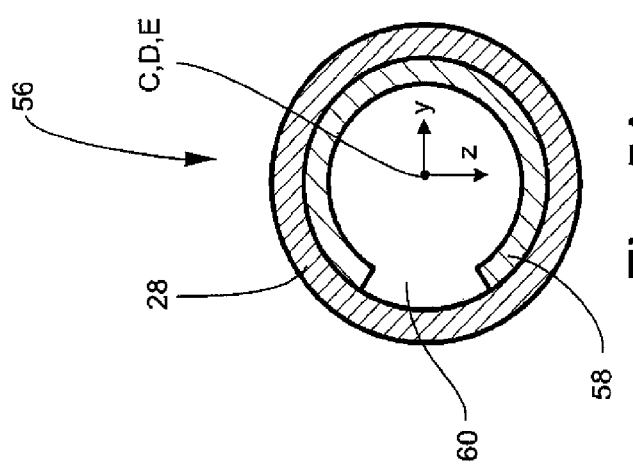
FIG. 5A is an end view of an embodiment of a tool head having a cathode with a discontinuous cross-section.

FIG. 5A shows another example of a tool head 56 having an asymmetric geometry. Tool head 56 may include a conductive tube (cathode) 58 having a discontinuous cross-section. In FIG. 5A, the discontinuity is a slot 60 formed in tube 58. Other than slot 60, the wall thickness of tube 58 may be uniform. Insulating layer 28 may have a constant thickness. Thus, the centerlines C, D, E of hole 48, tube 58, and tool head 56, respectively, may be coincident.

Figure 5B:
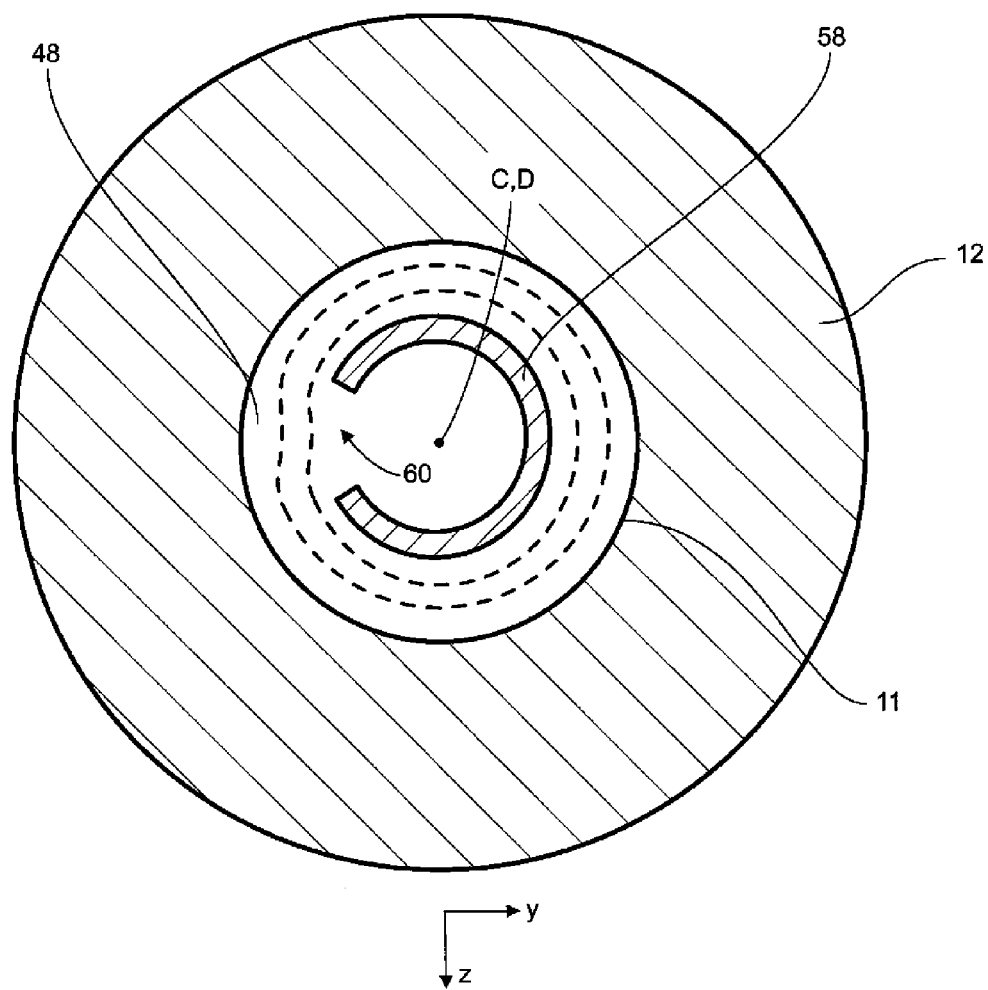
FIG. 5B is a simplified diagram of equipotential lines of an asymmetric electric field.

FIG. 5B is a simplified representation of a radially asymmetric electric field analogous to the asymmetric field that may be produced by tool head 56 of FIG. 5A. For simplicity, the field resulting from conductive tube 58 is shown within grounded conductive work piece 12 at an elevated voltage with no insulating layer 28 or EMF 20 present. The dashed lines are lines of equipotential. Centerline D of tool head 56 may be coincident with centerline C of hole 48. Where the lines of equipotential are closer, the electric field is increased.

Control of the electric field produced by tool head 56 may be analogous to that of tool head 50 of FIGS. 4A-B. The electric field produced by tool head 56 at wall 11 may be less where slot 60 is located. Similarly, in tool head 50, the electric field at wall 11 may be less where the insulating layer 28 is thicker and conductive tube 52 is further from wall 11.

A tool head may include a plurality of cathodes. The cathodes may be insulated from each other. Power supply 18 may provide relative voltage control between the plurality of cathodes. A tool head with multiple cathodes may operate with or without rotation about the x-axis (roll).

Figure 6A:
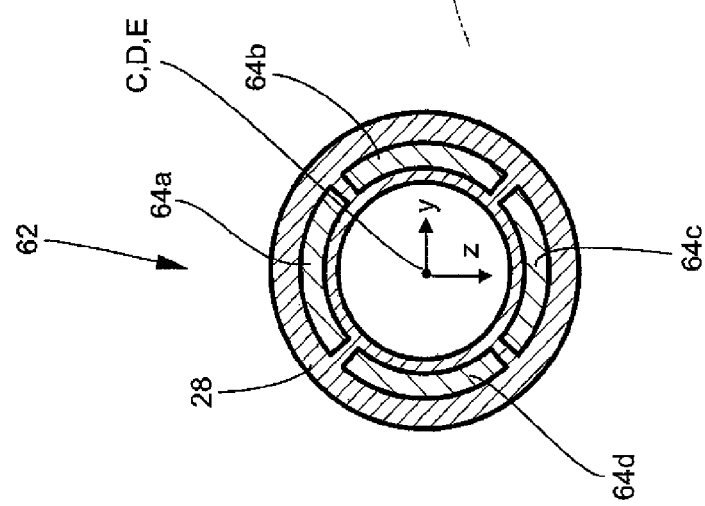
FIG. 6A is an end view of an embodiment of a tool head with multiple cathodes.

FIG. 6A is an example of a tool head 62 with multiple cathodes 64 (64a, 64b, 64c, 64d). Tool head 62 may have a generally circular cross-section. Cathodes 64 may be arranged as disjointed segments of a circle. Cathodes 64 may have a same thickness. Cathodes 64 may be disposed in insulating material 28 such that cathodes 64 are insulated from each other. Insulating material 28 may cover exterior and interior surfaces of cathodes 64. The hole created by the electrical machining action of cathodes 64 may include an overcut. The overcut may result in a hole that is larger in cross-section than the tool head 62. Thus, entire tool head 62, including insulating material 28, may pass through the hole with sufficient clearance between tool head 62 and the hole.

Centerlines C and E of hole 48 and tool head 62 may be coincident. The centerline D of a hypothetical tube containing the disjointed cathode segments 64 may be coincident with centerlines C and E. Increasing the voltage to cathode 64b located in the positive y-axis direction and decreasing the voltage to cathode 64d in the negative y-axis direction may increase yaw.

Figure 6B:
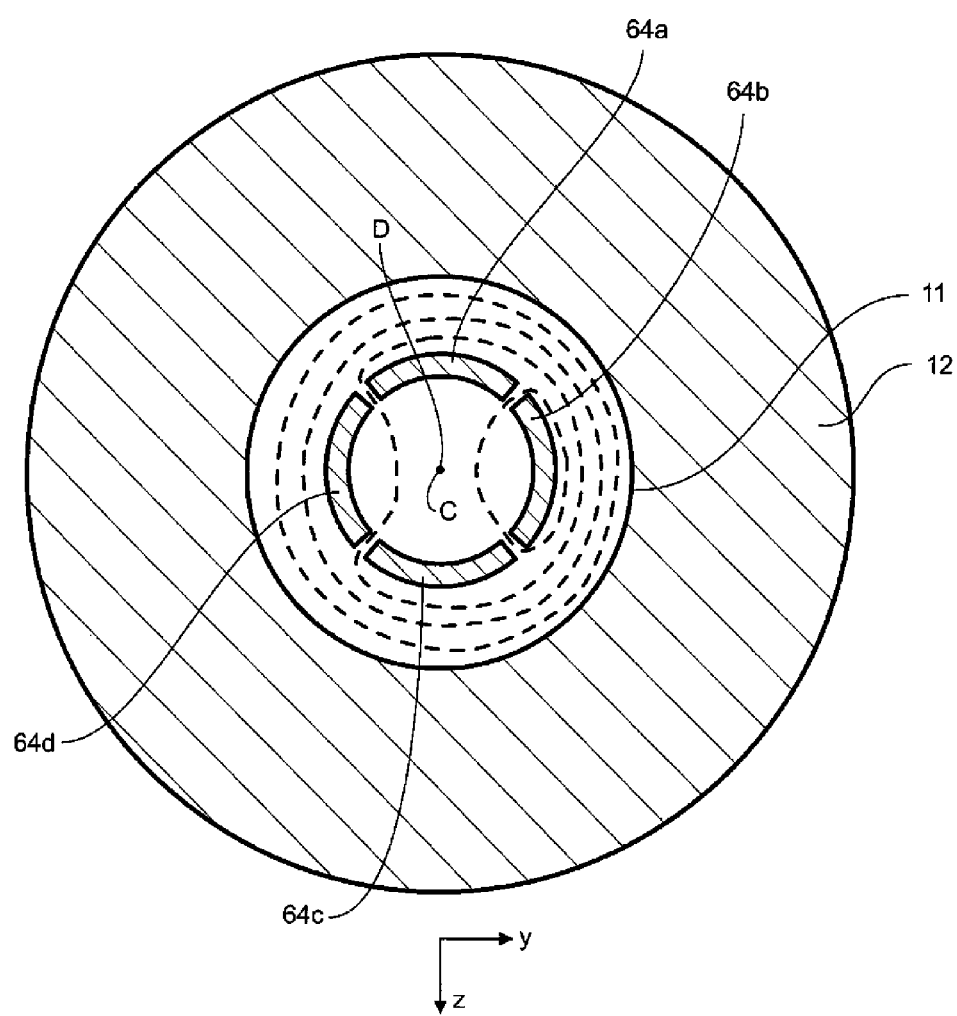
FIG. 6B is a simplified diagram of equipotential lines of an asymmetric electric field.

FIG. 6B is a simplified representation of a radially asymmetric electric field analogous to the asymmetric field that may be produced by tool head 62 of FIG. 6A. For simplicity, the field resulting from cathodes 64a-d is shown within grounded conductive work piece 12 at an elevated voltage with no insulating layer 28 or EMF 20 present. The dashed lines are lines of equipotential. Centerline D of cathodes 64a-d may be coincident with centerline C of hole 48. Where the lines of equipotential are closer, the electric field is increased.

Figure 7:
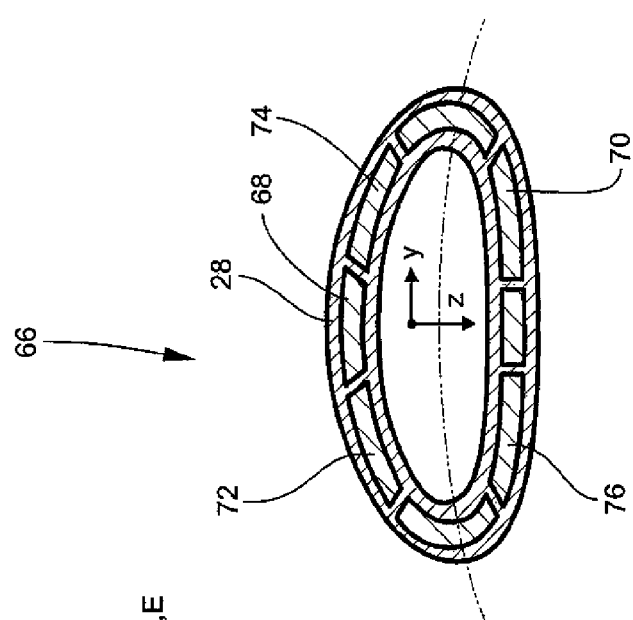
FIG. 7 is an end view of an embodiment of a tool head for machining non-circular holes.

FIG. 7 is an example of a tool head 66 with a generally elliptical cross-section and a plurality of cathodes 68 disposed in insulating material 28. In FIG. 7, the generally elliptical cross-section of tool head 66 may be a reniform cross-section. Tool head 66 may be used to machine holes that may not be round. The reniform shape of tool head 66 may be well suited for integral midwall cooling holes in a cannon. In tool head 66, independent voltage control of cathodes 68 may also control the cross-sectional orientation of hole 48. That is, if the orientation of hole 48 begins to twist, voltage control of cathodes 68 may be used to maintain the orientation of hole 48 and prevent twist. For example, to apply a clockwise (positive roll) twist to the orientation of hole 48 (as a correction for a measured undesirable counter-clockwise drift), a greater voltage may be applied to the lower right and upper left opposed pair of cathodes 70, 72 and a lower voltage may be applied to the upper right and lower left opposed pair of cathodes 74, 76.

Many geometric variations are possible to create an asymmetric electric field with respect to the centerline of the tool head and the hole. FIGS. 8A-C show a circular tool head 80 having a conductive tube 82 and insulating layer 28. At the face 84 of tool head 80, a portion of tube 82 extends axially beyond insulating layer 28 and has a circumferentially varying thickness. The electric field produced by tool head 80 may be greater to the right side, as viewed in FIG. 8B.

FIGS. 9A-C show a circular tool head 86 having a conductive tube 88 and insulating layer 28. Tool head 86 may further exaggerate the electric field on the right side, compared to tool head 80. Tool head 86 may include an angled bevel cut at the face 90 that favors additional electric field axial extent to the right side without necessarily increasing the electric field strength. For a non-rotating tool, this nominally increases the duration of exposure to wall 11 on the right side versus the left side by the difference in axial extent divided by the axial feed rate. During the increased duration of exposure, more material may be removed from wall 11 on the right side. Control of drilling may be achieved by modulating the rotation frequency (roll), modulating the voltage amplitude, or using multiple cathodes. While FIGS. 8A-C and 9A-C show cathodes 82, 88 that may radially extend to the outer extent of insulating layer 28, lesser radial extensions of cathodes 82, 88 may also achieve desirable electric field distortions.

Proof of concept tests were conducted using tool heads 80 and 86 of FIGS. 8A-C and 9A-C, respectively, and work pieces made of gun steel cut from the chamber wall of a used M198 towed howitzer cannon.

Using tool head 80 of FIGS. 8A-C, with no roll and constant voltage, a hole 13.5 mm in diameter and 150 mm deep was machined. After machining, the work piece was sawed in half such that the machined hole was longitudinally bisected. Measurements of the machined hole showed that the centerline location at the bottom of the hole was offset 1.0 mm from the centerline at the top of the hole. The offset was in the direction of the thicker portion of conductive tube (cathode) 82 of FIGS. 8A-C.

In the second test, a hole of 13.5 mm diameter and 50 mm deep was machined using a conventional symmetric tool head, such as tool head 17 in FIGS. 3A-B. Then, using tool head 86 of FIGS. 9A-C, with no roll and constant voltage, an additional 10 mm of depth was machined. After machining, the work piece was sawed in half such that the machined hole was longitudinally bisected. The centerline location at the bottom of the hole (60 mm depth) was offset 1.3 mm from the centerline at 50 mm depth. The offset was in the direction of the thicker portion of conductive tube 88 (cathode) of FIGS. 9A-C.

Figure 10:
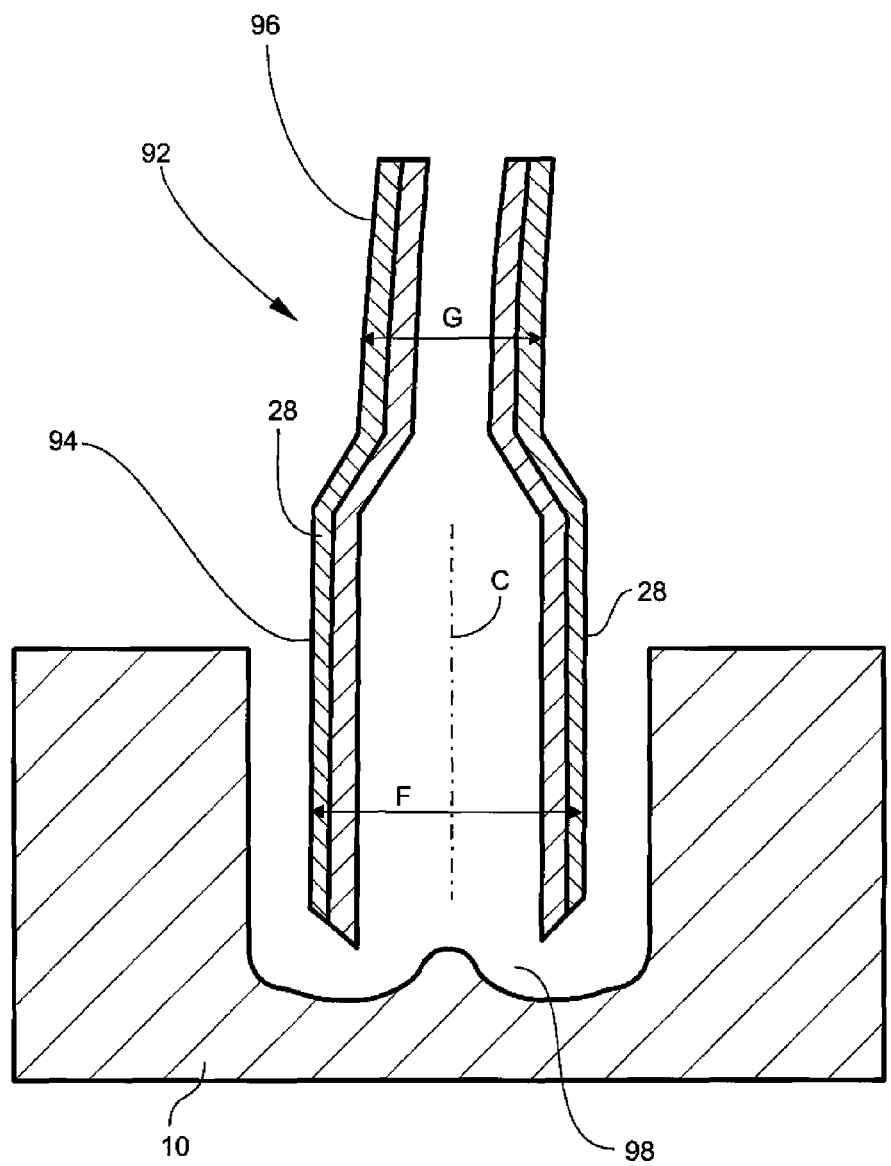
FIG. 10 is a schematic view of a tool of varying diameter.

Because the electric field at the tool head may control the orientation of the hole being machined, reliance on mechanical properties of the entire tool length may not be necessary, in contrast to the prior art. FIG. 10 is a schematic view of a tool 92 having a tool head 94 and an upper tool portion 96 connected to tool head 94. Tool head 94 may be used to create an asymmetric electric field with respect to centerline C of hole 98. The outer diameter F of tool head 94 may be larger than the outer diameter G of upper tool portion 96. In contrast to the prior art, upper tool portion 94 need not provide the mechanical guidance for centerline C of hole 98. Indeed, a lower stiffness of upper tool portion 96 may be desirable to allow tool distortion and compliance to accommodate the desired hole centerline when drilling other than straight holes.

Smaller diameter G of upper tool portion 96 may also allow greater clearance between upper portion 96 and hole 98, which may avoid binding of tool 92 when machining other than straight holes. Similarly, reduced diameter upper tool portion 96 for tool head 94 may prevent binding of tool 92 in roll when machining non-round holes with a desired twist.

Figure 2:
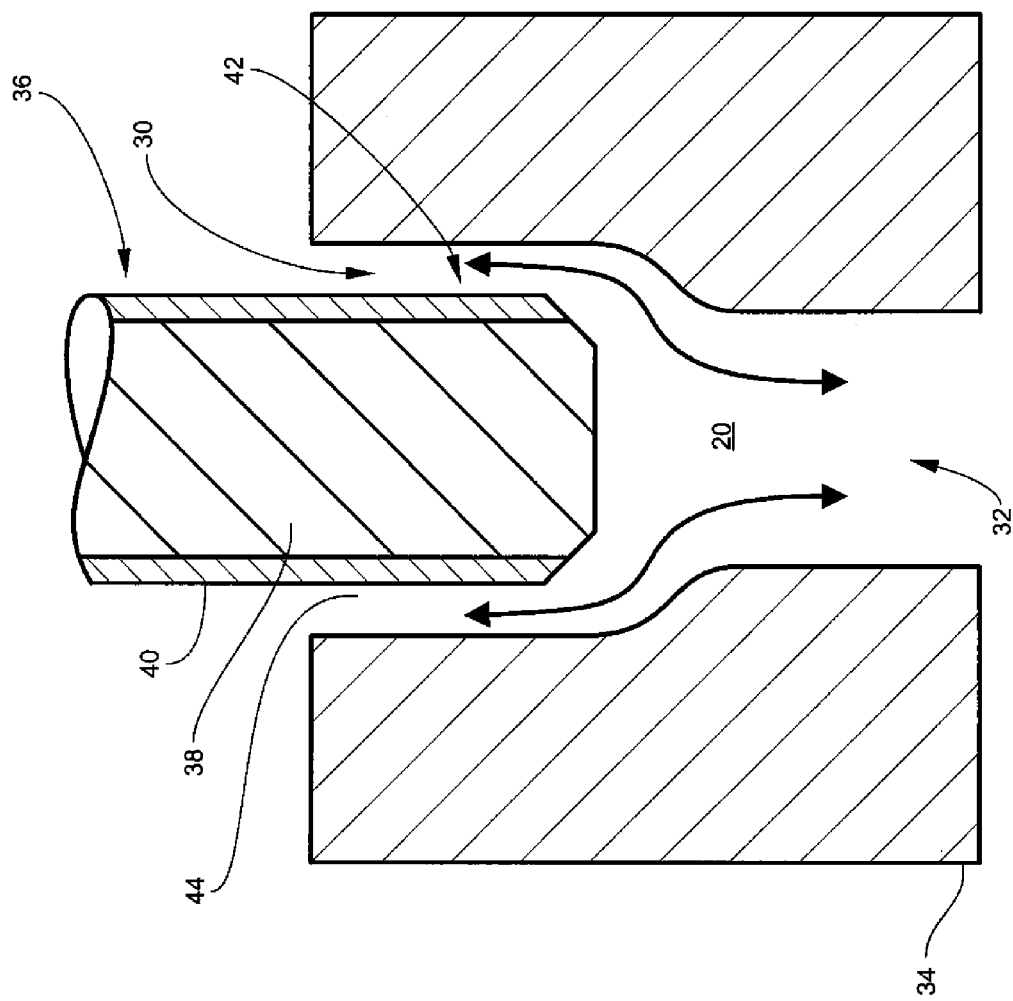
FIG. 2 is a schematic drawing of a known electrical machining process that includes a pilot bore.

FIG. 2 shows the case of machining hole 30 using a pilot hole or bore 32. In the inventive method (FIGS. 11A and B), tool 100 may be pulled through work piece 34 rather than pushed through work piece 34. Tool 100 may include a tool head 102 that may create an asymmetric electric field with respect to the centerline C of hole 30 using, for example, a slotted cathode. In FIG. 11, tool head 102 may move in the direction shown by arrow P. As discussed with reference to FIG. 10, the upper portion of tool 100 (FIG. 11) may have a smaller diameter than tool head 102.

In an alternative method to electrically machine a hole, an annular opening (trepanning) may be machined in a work piece using, for example, the tool head 62 of FIG. 6A. Trepanning will result when the overcut is sufficient to allow the tool to pass through the annulus, but the tool does not fully dissolve or erode the center core of the work piece. Trepanning may reduce the EMF processing and electricity required to electrically machine a hole. Should one wish to remove the center core of material of the work piece, tool head 62 may be modified by removing from at least one of the cathodes 64 the interior layer of insulation 28 adjacent the center opening.

Figure 12:
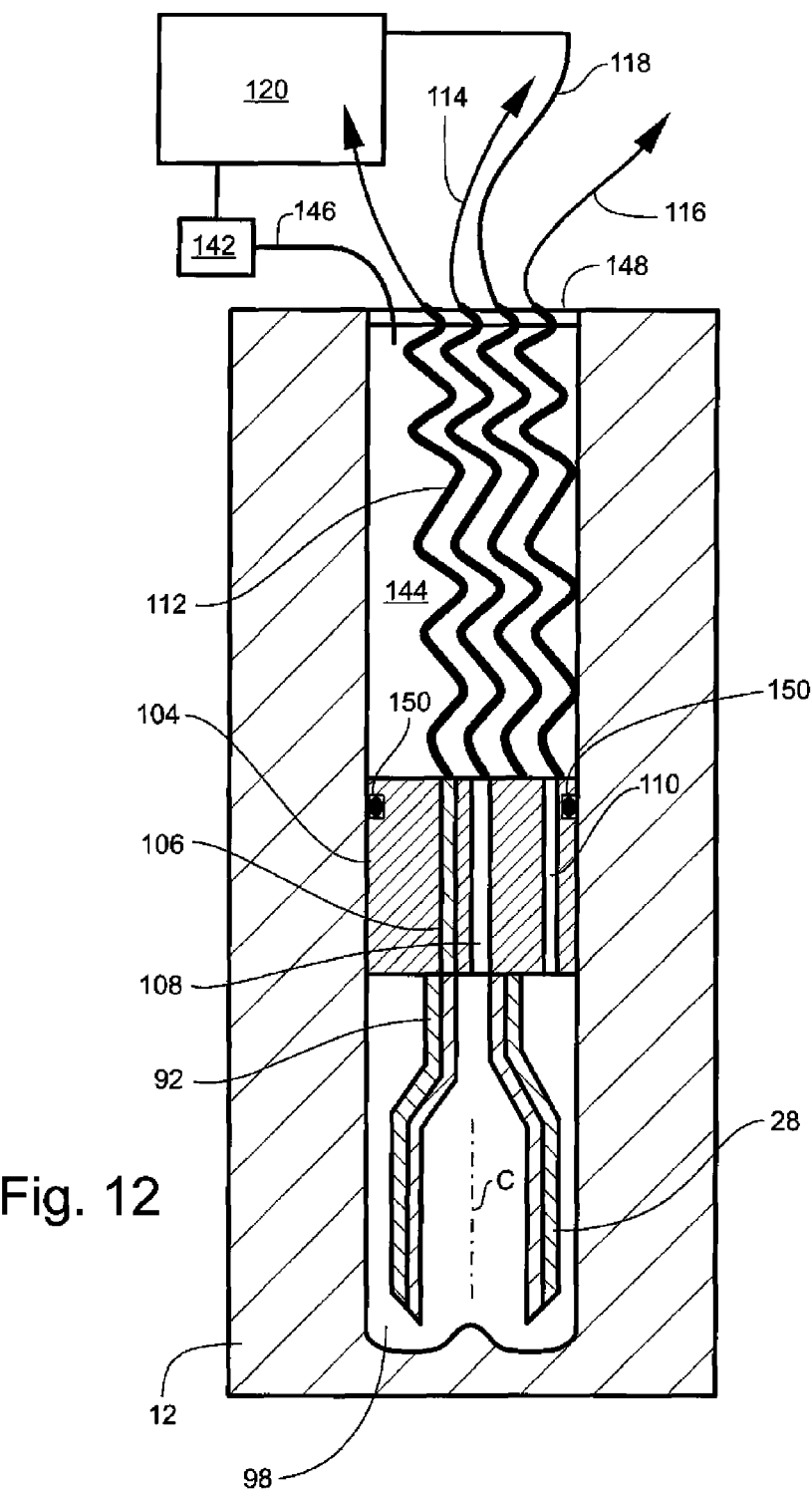
FIG. 12 is a schematic view of a tool holder positioned within a hole in the work piece.

In the case of larger diameter holes and in view of the reduced reliance upon conventional tool holder 16 (FIG. 1) for mechanical guidance, the functions of tool holder 16 may be provided in whole or in part within the hole itself. FIG. 12 is a schematic view of a tool holder 104 positioned in hole 98 in work piece 12. Tool 92 may be connected to tool holder 104. Tool holder 104 may include a cathode power conduit 106, a fluid inlet conduit 108 for EMF 20, and a fluid outlet conduit 110 for EMF 20. Flexible lines, such as cables and tubing, may be connected to tool head 104. A cathode power cable 112 may connect to cathode power conduit 106 and to a controller 120. An EMF inlet tube 114 may be connected to conduit 108 and to an EMF supply line. An EMF outlet tube 116 may be connected to fluid outlet conduit 110 and to an EMF return line. A tool holder control and power cable 118 may be connected to tool holder 104 and to controller 120.

Positioning of tool holder 104 may be achieved, for example, by a hydraulic power unit 142 that may supply hydraulic fluid 144 via hydraulic fluid conduit 146 to the volume between the top of tool holder 194 and a top seal plate 148 at the entry of hole 98. A tool holder seal 150 (for example, a piston ring) may provide a seal for hydraulic fluid 144 above tool holder 104 and EMF 20 below tool holder 104. Tool 92 and tool holder 104 may, thus, crawl through hole 98 as it is machined. Tool holder 104 may control the feed rate and rotational motion of tool 92. Tool 92 and tool holder 104 may not rely on mechanical forces or torques created by a far-removed tool holder (for example, tool holder 16 in FIG. 1 located outside of the machined hole). Tool holder 104 may react to the small torques between itself and the tool through friction with and conformance to the wall of hole 98.

A proposed earth to orbit mechanical launcher (Bundy et al., "Sizing a Slingatron-Based Space Launcher," AIAA Journal of Propulsion and Power, vol. 18, no. 2, pp. 330-337, March-April, 2002, and U.S. Pat. No. 7,032,584 issued to Tidman on Apr. 25, 2006) would have a 0.64 meter diameter bore that is 45,000 meters long, yielding an aspect ratio in excess of 70,000. Such a large bore may easily accommodate a tool holder such as tool holder 104. And, advances in microelectromechanical systems may enable the design of increasingly small tool holders 104 for insertion in smaller machined holes.

In some embodiments of the invention, twist or roll may be applied to a non-circular hole. FIG. 13A is a side view of a tool head 122 for machining a circular hole with a keyway or slot feature. FIG. 13B is a sectional view along the line 13B-13B of FIG. 13A and FIG. 13 C is a sectional view along the line 13C-13C of FIG. 13A. Tool head 122 may include a plurality of cathodes 124, 126, 128, 130, 132, and 134. Cathodes 124-134 may be insulated from each other with insulating material 28. The interior 136 of tool head 122 may be hollow. Cathodes 130 and 132 may be used to create the keyway or slot feature.

As seen in FIG. 13B, at the upper part of tool head 122, cathodes 124-134 may be disjointed segments of a circle surrounded by insulation 28. As one progresses axially toward face 138 of tool head 122, cathodes 130, 132 may begin to angle or flare radially outward, as seen in FIG. 13C. The gradually increasing radial extent of cathodes 130, 132 may create a tapered nub 140. Nub 140 may appear as a triangle in the side view of FIG. 13A.

If no twist or roll were applied to tool head 122, a circular hole with a key way or slot may be machined. On the other hand, the key way or slot may be twisted clockwise (as tool head 122 is positioned in FIGS. 13B-C) by imparting a higher voltage to cathode 132 than to cathode 130. If roll or twist is applied to tool head 122, then the geometry of nub 140 may be subject to limitations caused by binding of tool head 122 in the hole. Tool head 122 may be used to machine a bore with a rifling groove, for example. A plurality of keyways or slots may mimic a rifling broach.

In conventional EDM and ECDM processes, the cathode (tool) may not be insulated. When using the inventive method with an EDM or ECDM process, insulation 28 around the cathode may be required to avoid dissolution or erosion of the hole above the tool face. The tool head embodiments and methods disclosed herein may be used in, for example, ECM, EDM, and ECDM processes.

Numerous changes, alterations and modifications to the described embodiments are possible, without departing from the spirit and scope of the invention as defined in the appended claims, and equivalents thereof.

What is claimed is:

1. A method of electrically machining a hole in a conductive work piece, comprising:
   providing a tool having a conductive tool head, the tool head being in close proximity to the conductive work piece;
   applying voltage across the tool head and the work piece to create an electric field in the hole at the tool head, the electric field being asymmetric with respect to a centerline of the hole; and
   changing an orientation of the hole by removing material from the work piece using the asymmetric electric field, wherein providing a tool includes providing a tool having a conductive tool head with an asymmetric geometry, wherein the tool head comprises insulating material and a plurality of electrodes disposed in the insulating material, the plurality of electrodes being insulated from each other.

2. The method of claim 1, further comprising applying a plurality of voltages across the plurality of electrodes and the work piece.

3. The method of claim 2, wherein the tool head has a circular cross-section.

4. The method of claim 2, wherein the tool head has a generally elliptical cross-section.

5. The method of claim 4, wherein the generally elliptical cross-section is a reniform cross-section.

* * * * *